(12) United States Patent
Truong

(10) Patent No.: US 7,198,011 B2
(45) Date of Patent: Apr. 3, 2007

(54) INTERNAL COMBUSTION ENGINE

(76) Inventor: M. Nhut Truong, 2814 Tims Street, Abbotsford, British Columbia (CA) V2T 2G9

( * ) Notice: Subject to any disclaimer, the term of this patent is extended or adjusted under 35 U.S.C. 154(b) by 0 days.

(21) Appl. No.: 11/000,376

(22) Filed: Dec. 1, 2004

(65) Prior Publication Data
US 2006/0112912 A1 Jun. 1, 2006

(51) Int. Cl.
*F02B 25/00* (2006.01)
(52) U.S. Cl. ............... 123/65 BA; 123/65 PE; 123/65 V
(58) Field of Classification Search ............ 123/65 E, 123/65 VC, 65 BA, 65 PE, 73 C, 559.1
See application file for complete search history.

(56) References Cited

U.S. PATENT DOCUMENTS

| | | | |
|---|---|---|---|
| 2,330,866 A | 10/1943 | Camner | |
| 3,301,235 A | 1/1967 | Briggs | |
| 3,974,802 A | 8/1976 | Lundquist | |
| 4,671,218 A | 6/1987 | Weiland | |
| 4,719,880 A | 1/1988 | Schlunke et al. | |
| 4,938,178 A | 7/1990 | Schlunke et al. | |
| 4,993,372 A | 2/1991 | Mott et al. | |
| 5,020,485 A * | 6/1991 | Watanabe | 123/73 C |
| 5,133,309 A | 7/1992 | Ishii | |
| 5,261,359 A | 11/1993 | Hull | |
| 5,441,019 A | 8/1995 | Sayer et al. | |
| 5,692,468 A * | 12/1997 | Haman et al. | 123/259 |
| 6,536,384 B1 * | 3/2003 | Keoppel | 123/70 R |
| 6,722,128 B1 * | 4/2004 | Adrian | 60/600 |
| 6,834,626 B1 * | 12/2004 | Holmes | 123/52.5 |

FOREIGN PATENT DOCUMENTS

| | | |
|---|---|---|
| GB | 331911 | 2/1929 |
| GB | 2297585 | 8/1996 |
| WO | WO 98/51908 | 11/1998 |

\* cited by examiner

*Primary Examiner*—Stephen K. Cronin
*Assistant Examiner*—Hyder Ali

(57) ABSTRACT

There is provided a two stroke internal combustion engine comprising a cylinder and a piston. The cylinder has a cylinder head, a wall and a crankcase. The wall extends between the cylinder head and the crankcase. The cylinder head has a first opening and a second opening. The piston is mounted for reciprocation in the cylinder. The cylinder head, the wall and the piston form a combustion chamber. The engine further includes a direct injector and a spark plug. The direct injector is mounted in the first opening for injecting fuel into the combustion chamber. The spark plug is mounted in the second opening for igniting a fuel-air mixture in the combustion chamber. The engine also includes an inlet port and an exhaust port. The inlet port and the exhaust port are in the wall of the cylinder. The exhaust port is exposed by the piston before the inlet port on an exhaust cycle so a pressurized exhaust gas is substantially exhausted before the inlet port opens. The engine further includes a first forced air induction means for forcing air into the inlet port. The first forced air induction means is connected to the inlet port.

26 Claims, 19 Drawing Sheets

INTERNAL COMBUSTION ENGINE

BACKGROUND OF THE INVENTION

1. Field of the Invention

The present invention relates to internal combustion engines, and in particular to two stroke engines.

2. Description of the Related Art

Conventional two stoke engines feed a fuel-air mixture into a crankcase that is below a piston in a cylinder. From the crankcase, the fuel-air mixture is then directed into a combustion chamber by pressure generated by the piston travelling into the crankcase. This two stroke engine has the disadvantage that oil from the crankcase, used for lubrication, is undesirably mixed with the fuel-air mixture, which is then combusted in the combustion chamber, producing unwanted pollutants and reducing power output.

In U.S. Pat. No. 4,993,372 issued Feb. 19, 1991 to Mott et al., there is shown a two stroke internal combustion engine that has in the cylinder wall an inlet port to which fresh air is supplied under pressure, the inlet port being covered and exposed by the piston during reciprocation thereof in the cylinder. This engine makes use of an exhaust valve to release combusted gases. Since the exhaust is under high pressure, the use of a valve for the exhaust reduces the reliability of the engine.

In U.S. Pat. No. 4,719,880 issued Jan. 19, 1988 to Schlunke et al., there is disclosed a direct injected two stroke cycle internal combustion engine having a cylinder, a cylinder head at one end of the cylinder, a piston mounted for reciprocation in the cylinder, and an inlet port and an exhaust port in the wall of the cylinder at substantially diametrically opposite locations in the cylinder. This internal combustion engine does not make use of a forced air induction component.

In another type of two stroke engine, a fan blows a fresh gas and air mixture into a cylinder when a piston uncovers an inlet port so that any residual exhaust is flushed out through an exhaust port. This type of two stroke engine suffers from the disadvantage of having unburnt fuel escape through the exhaust port while the fan blows the fuel-air mixture into the cylinder.

In theory two-stroke engines should have twice the power compared to four-stroke engines with the same displacement, because two-stroke engines have twice the number of power strokes. Conventional two-stroke engines are known to be less complex, compact, light, cheaper to manufacture and to maintain, whereas four-stroke engines are proven to be reliable and clean burning. The invention of direct injection has improved fuel efficiency and reduced emissions in two-stroke engines.

It is an object of the present invention to combine the advantages of 2-stroke engines, namely the advantages mentioned above, with the reliability of four-stroke engines by bringing together the concepts of direction injection and a fan-scavenged two-stroke engine.

BRIEF SUMMARY OF THE INVENTION

According to the present invention, there is provided a two stroke internal combustion engine comprising a cylinder and a piston. The cylinder has a cylinder head, a wall and a crankcase. The wall extends between the cylinder head and the crankcase. The cylinder head has a first opening and a second opening. The piston is mounted for reciprocation in the cylinder. The cylinder head, the wall and the piston form a combustion chamber. The engine further includes a direct injector and a spark plug. The direct injector is mounted in the first opening for injecting fuel into the combustion chamber. The spark plug is mounted in the second opening for igniting a fuel-air mixture in the combustion chamber. The engine also includes an inlet port and an exhaust port. The inlet port and the exhaust port are in the wall of the cylinder. The exhaust port is exposed by the piston before the inlet port on an exhaust cycle so a pressurized exhaust gas is substantially exhausted before the inlet port opens. The engine further includes a first forced air induction means for forcing air into the inlet port. The first forced air induction means is connected to the inlet port.

According to another embodiment of the invention, there is provided a method of exhausting pressurized exhaust gas during an exhaust cycle from a two stroke internal combustion engine. The two stroke internal combustion engine comprises a cylinder and a piston. The cylinder has a cylinder head, a wall and a crankcase. The wall extends between the cylinder head and the crankcase. The cylinder head has a first opening and a second opening. The piston is mounted for reciprocation in the cylinder. The cylinder head, the wall and the piston form a combustion chamber. The engine further includes a direct injector and a spark plug. The direct injector is mounted in the first opening for injecting fuel into the combustion chamber. The spark plug is mounted in the second opening for igniting a fuel-air mixture in the combustion chamber. The engine also includes an inlet port and an exhaust port. The inlet port and the exhaust port are in the wall of the cylinder. The exhaust port is exposed by the piston before the inlet port on an exhaust cycle so a pressurized exhaust gas is substantially exhausted before the inlet port opens. The engine further includes a first forced air induction means for forcing air into the inlet port. The first forced air induction means is connected to the inlet port. The method includes the steps of opening the exhaust port by the travel of the piston during the exhaust cycle; exhausting a substantial portion of the pressurized exhaust gas; opening the inlet port by the travel of the piston during the exhaust cycle; forcing air into the combustion chamber through the inlet port; scavenging remaining exhaust gases; and exhausting scavenged exhaust gas.

BRIEF DESCRIPTION OF THE DRAWINGS

The present invention will be more readily understood from the following description of preferred embodiments thereof given, by way of example, with reference to the accompanying drawings, in which.

DESCRIPTION OF THE PREFERRED EMBODIMENTS

Figure 1A:
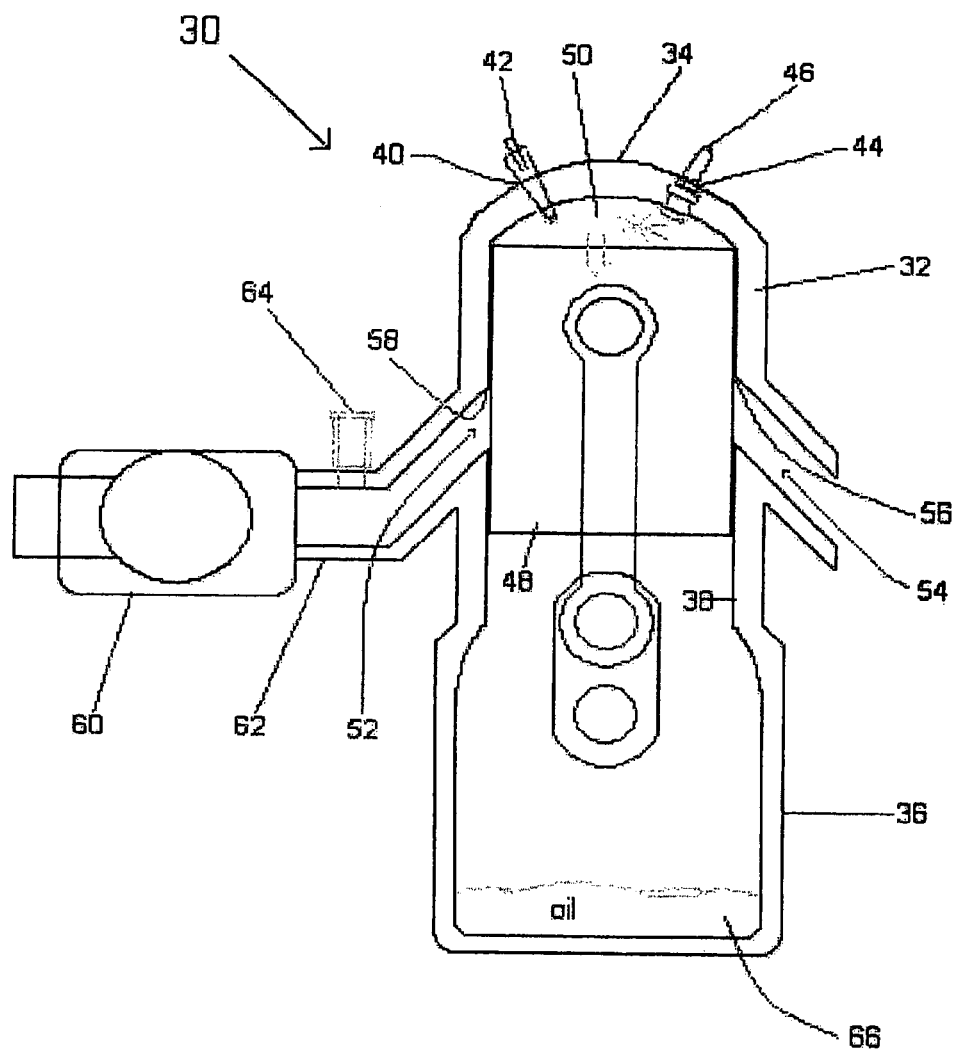
FIGS. 1a–h show views in cross-section through a two stroke internal combustion engine according to a preferred embodiment of the present invention illustrated respectively in a first combustion position, an exhaust position, an intake position, a bottom dead center position, a first compression position, a second compression position, a third compression position and a second combustion position.

With reference to FIG. 1a, there is illustrated a two stroke internal combustion engine indicated generally by reference numeral 30. The engine 30 is preferably used in V configurations, e.g. V-2, V-4, V-6 or V-8, in water cooled applications, and flat-2, flat-4, flat-6 and flat-8 configurations in air cooled applications. However, it can alternatively be used in other configurations. The internal combustion engine 30 comprises a cylinder 32 having a cylinder head 34 and a crankcase 36. The cylinder 32 has a cylinder wall 38 extending between the cylinder head 34 and the crankcase 36. The cylinder head 34 has a first opening 40, wherein a direct injector 42 is mounted, and a second opening 44, wherein a spark plug 46 is mounted.

The engine 30 further includes a piston 48 mounted for reciprocation in the cylinder 32. The cylinder head 34, wall 38 and piston 48 form a combustion chamber 50 at an end of the piston 48 opposite from the crankcase 36.

The cylinder wall 38 has a permanently open inlet port indicated generally by reference numeral 52 and a permanently open exhaust port indicated generally by reference numeral 54.

The inlet port 52 is located substantially diametrically opposite from the exhaust port 54, in this example, but in other embodiments the inlet port is not restricted to this location. An upper edge 56 of the exhaust port is closer to the cylinder head 34 than an upper edge 58 of the inlet port 52. The inlet port 52 and the exhaust port 54 are exposed in timed relation by the reciprocating piston 48.

The engine 30 further includes a forced air induction means 60, which in the present embodiment is a supercharger, for forcing air into the inlet port 52. In other embodiments, e.g. for an aircraft application, the forced air induction means 60 can be a turbocharger. The forced air induction means is connected to the inlet port by inlet conduit 62 and provides air under pressure to the combustion chamber 50.

A blow-off valve 64 provides an escape route for air under excessive pressure in the inlet conduit 62.

In operation of the engine 30, and starting from an initial piston position shown in FIG. 1a, in which the piston 48 is at a top dead center position, i.e. the position nearest the cylinder head 34, the combustion chamber 50 contains a compressed fuel-air mixture that is ignited by the spark plug 46, thereby creating pressurized exhaust gases, which initiates the exhaust cycle by propelling the piston downwards towards the crankcase 36.

Figure 1B:
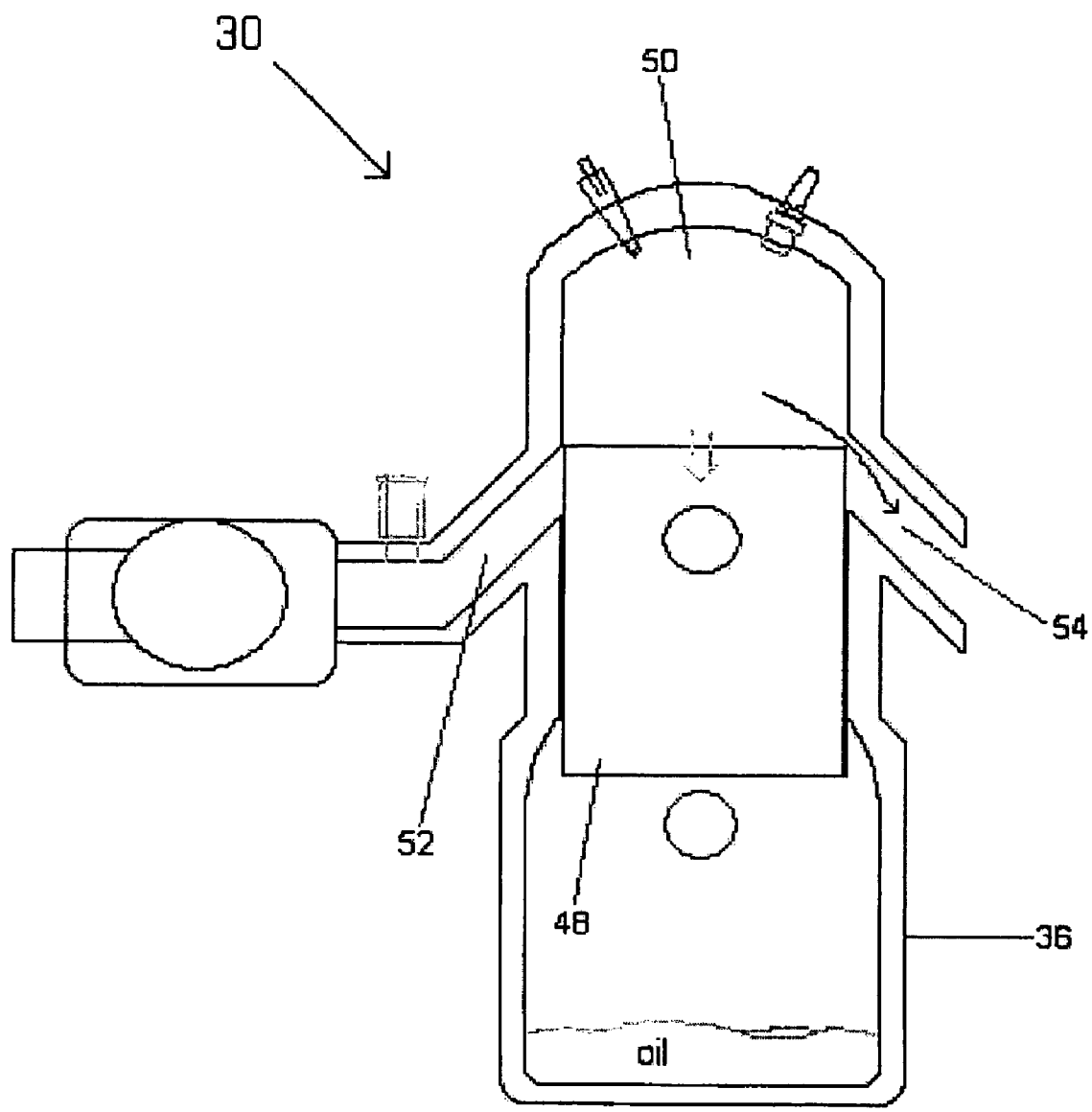

Now, referring to FIG. 1b, the piston 48 is illustrated during the exhaust cycle where it begins to uncover and therefore open the exhaust port 54 as it travels towards the crankcase 36. The pressurized exhaust gases escape from the combustion chamber 50 through the exhaust port 54, thereby reducing the pressure within the combustion chamber substantially. The piston 48 continues to travel towards the crankcase 36.

Figure 1C:
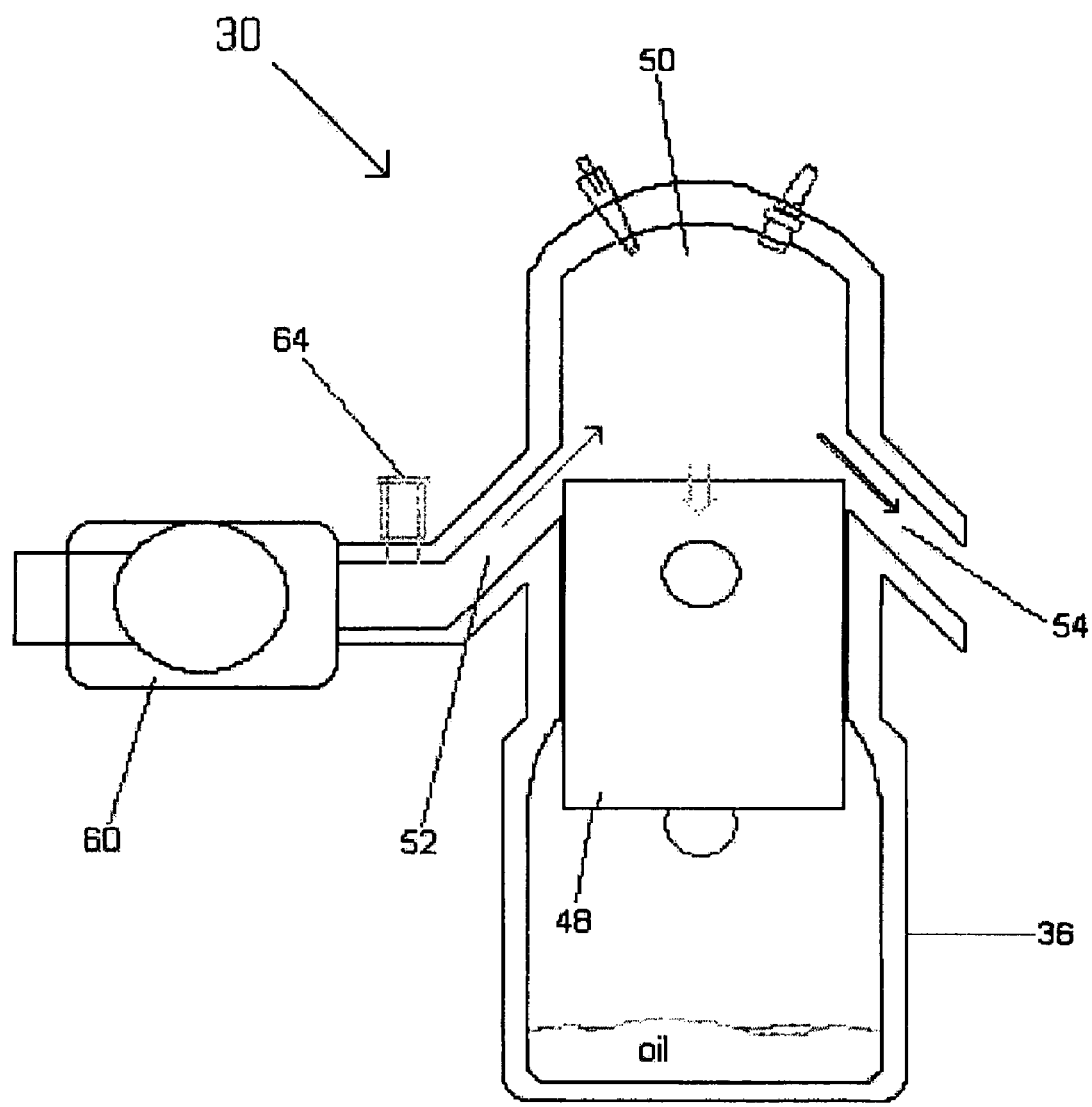

Next, referring to FIG. 1c, the piston 48 has travelled far enough towards the crankcase 36 that inlet port 52 begins to be uncovered. The forced induction component 60 forces new air under pressure to enter the combustion chamber 50 through inlet port 52. The new air entering the combustion chamber 50 under pressure serves in part to scavenge any remaining exhaust gas out through the exhaust port 54.

Figure 1D:
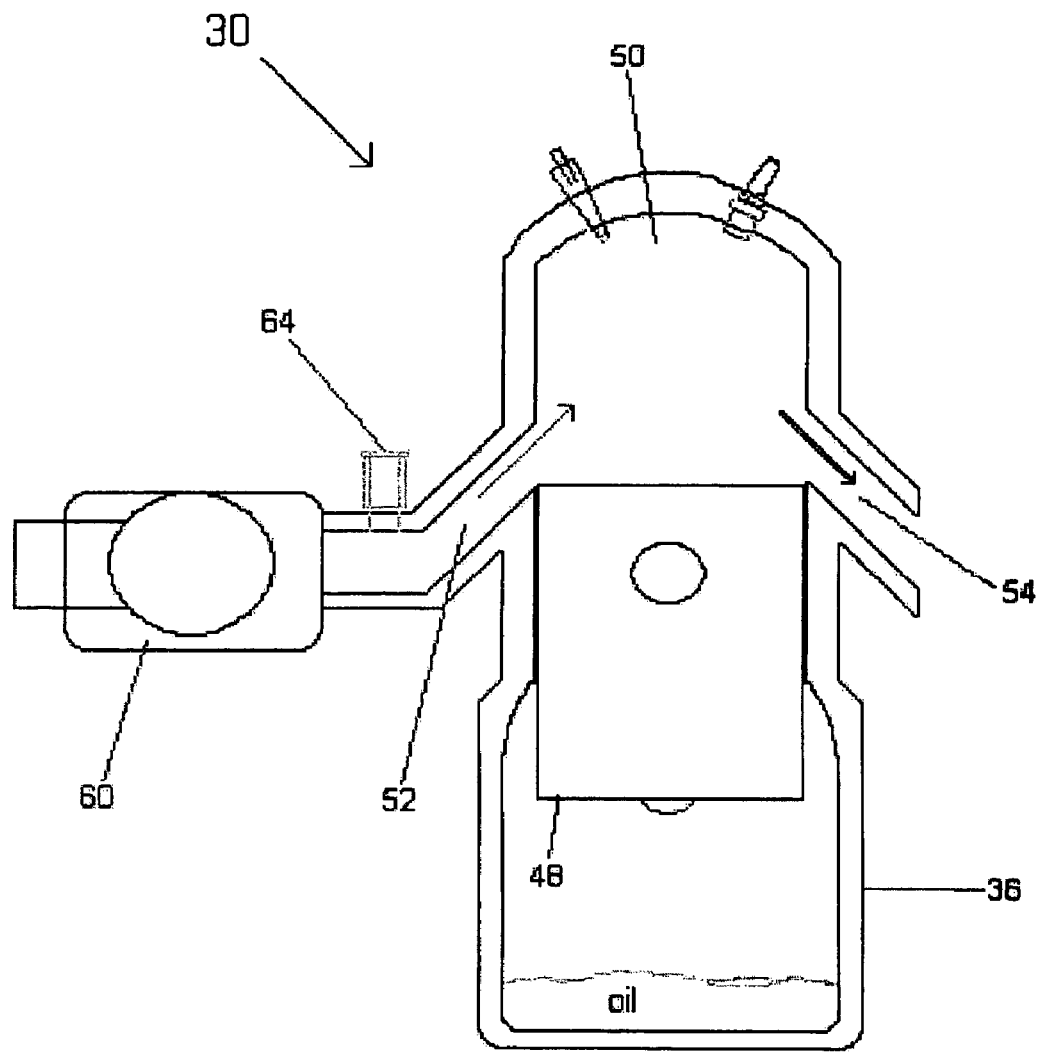

When the piston 48 reaches its bottom dead center position, as illustrated in FIG. 1d, the inlet port 52 and the exhaust port 54 are completely open. The exhaust gases have evacuated the combustion chamber 50, and the combustion chamber has been replenished with new air.

Figure 1E:
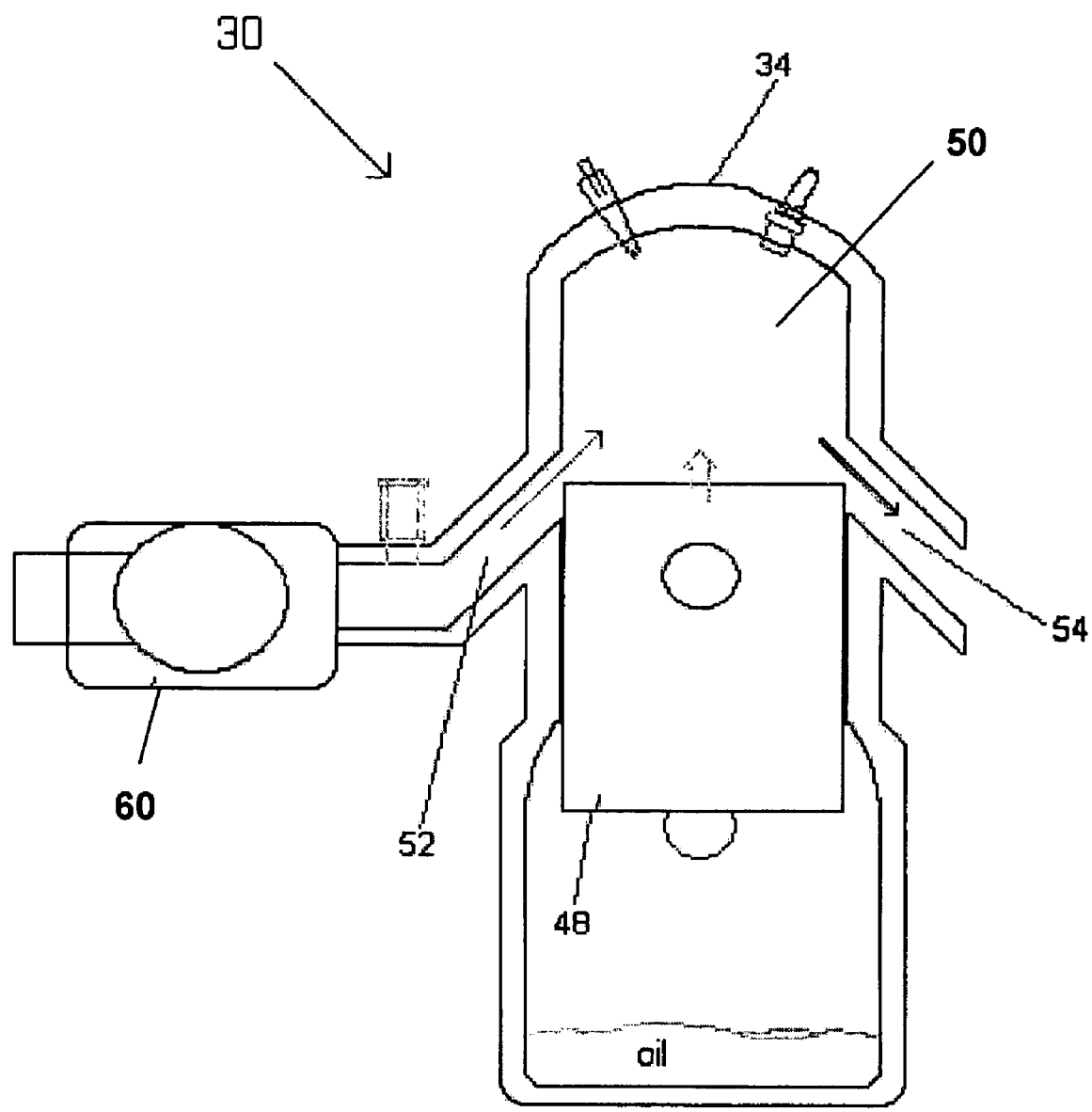

Now, referring to FIG. 1e, the piston 48 begins the compression cycle by travelling towards the cylinder head 34. The inlet port 52 and the exhaust port 54 are covered and closed by the piston 48 as it travels towards the cylinder head 34. The forced air induction component 60 forces new air into the combustion chamber 50 as long as the inlet port 52 is not closed by the piston 48.

Figure 1F:
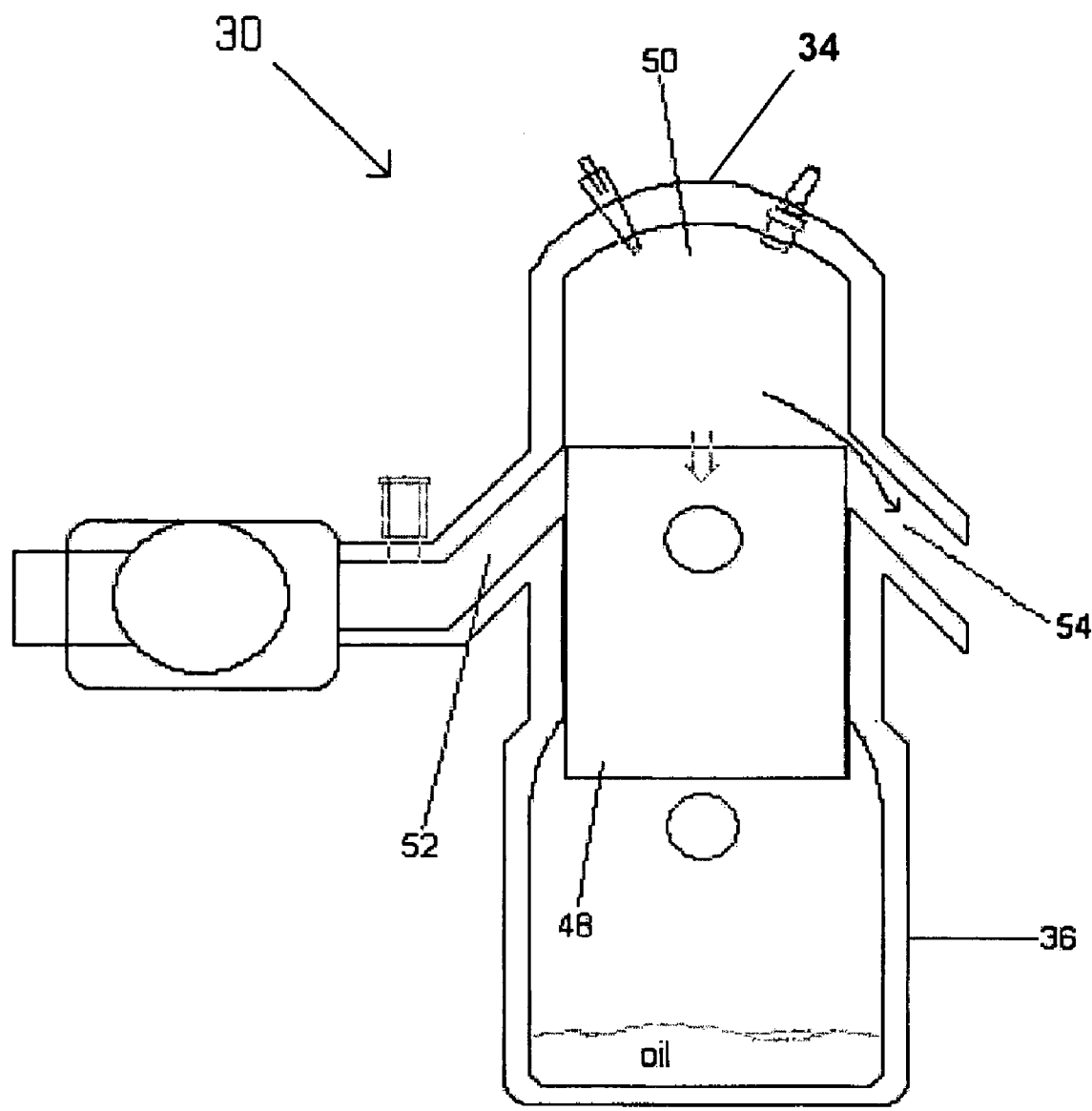

When the piston 48 closes the inlet port 52, while travelling towards the cylinder heat 34, the exhaust port 54 is still open. Shortly thereafter, the piston 48 closes the exhaust port 54, as illustrated in FIG. 1f.

Figure 1G:
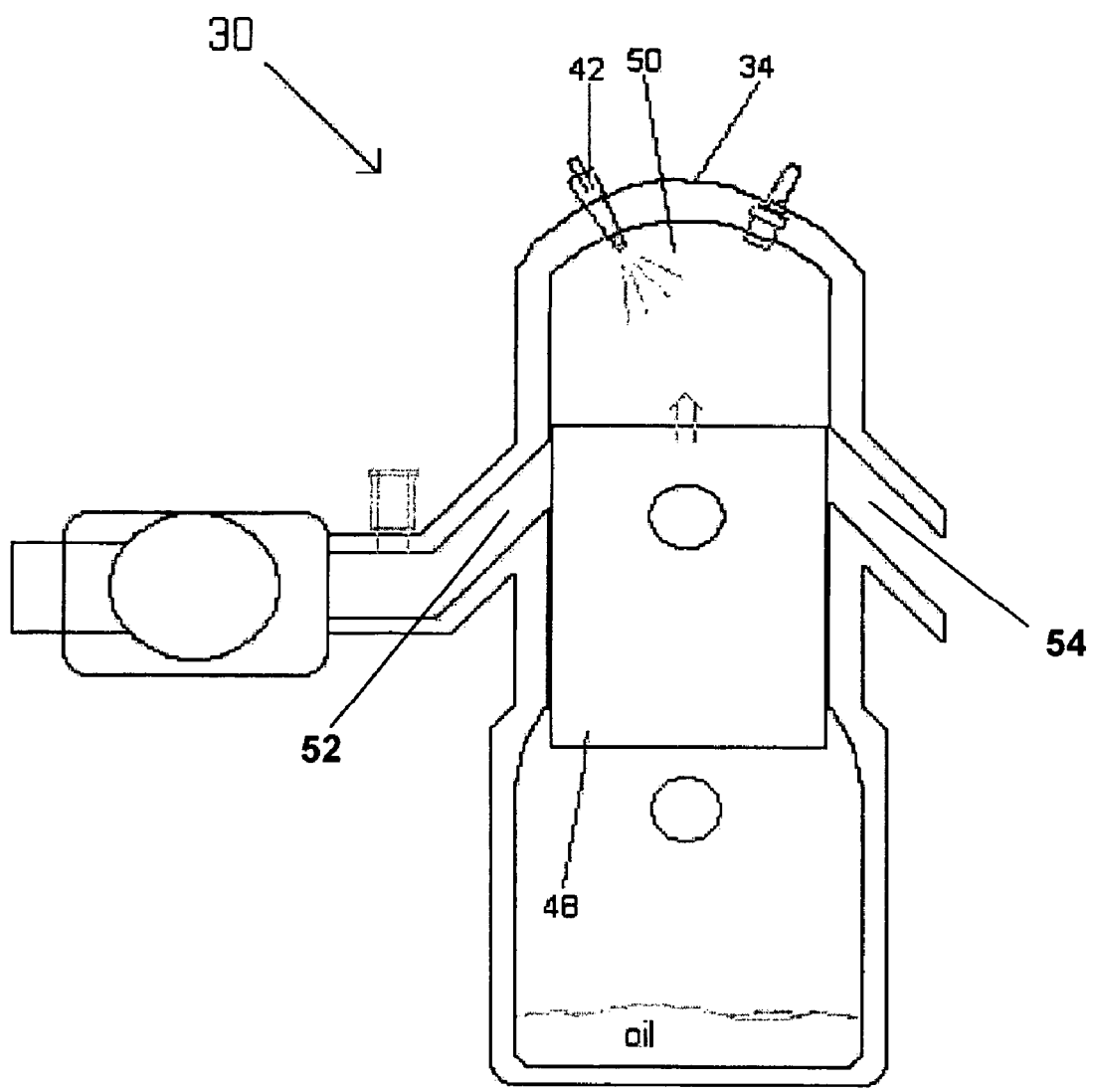

Fuel timing will need to be mapped for specific applications. Some time after the inlet port 52 and the exhaust port 54 are closed by the piston 48, the direct injector 42 injects fuel into the combustion chamber 50, as illustrated in FIG. 1g. The timing of the fuel injection is controlled by a direct injection system, for example, such as the Orbital DI System from Orbital Engine Corporation Limited, or the Mitshubishi GDI system from Mitshubishi. In the present embodiment the fuel is gasoline, but the engine 30 can be modified to use diesel or alternative fuels (e.g. alcohol, natural gas, gas or propane).

The piston 48 continues to travel towards the cylinder head 34 while the direct injector 42 injects fuel into the combustion chamber, thereby compressing the fuel-air mixture.

Figure 1H:
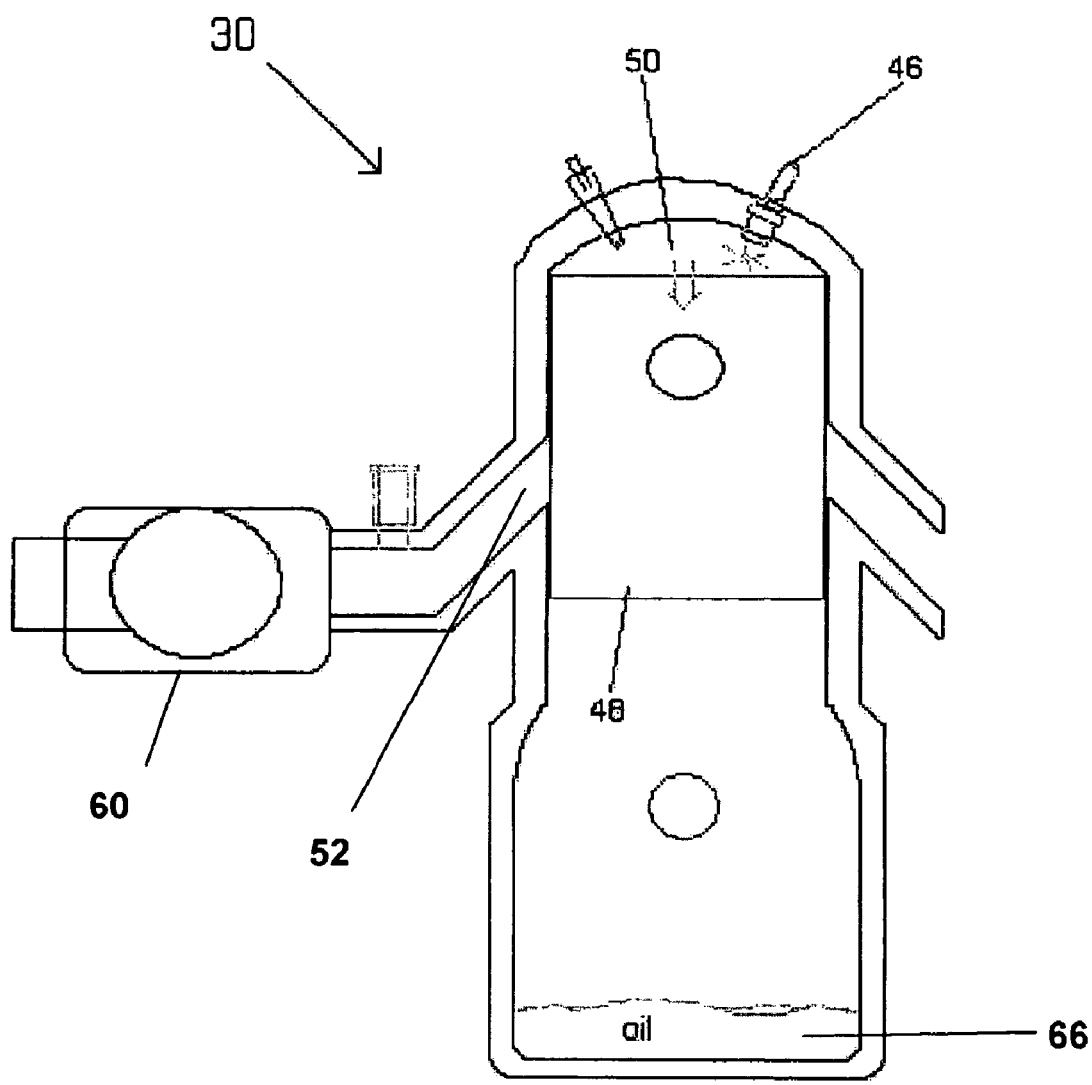

When the piston 48 reaches the top dead center position, illustrated in FIG. 1h, the direct injection system activates the spark plug 46 which ignites the compressed fuel-air mixture in the combustion chamber 50. From this point, the above-described cycle of operation of the engine is repeated.

An advantage of the present embodiment is that the crankcase is not required to be an air pump, as is the case in conventional two stroke combustion engines. Instead, the forced induction component 60 forces air directly into the combustion chamber 50 when the piston 48 opens the inlet port 52.

Another advantage of the present embodiment is the prevention of crankcase oil 66 from reaching the combustion chamber 50 and being combusted with fuel and air. Since only fuel and air are allowed into the combustion chamber 50, the engine 30 has a higher power output than conventional two stroke engines. In theory engine 30 should gain a higher power output than conventional two stroke engines, burning a same octane rated fuel, because no oil is allowed to contaminate the combustion mixture. The present embodiment, as a result, is designed to provide the reliability, power efficiency and clean burning characteristics of four stroke engines, while maintaining the benefits of two stroke engines, namely reduced weight, complexity, cost and maintenance.

The forced induction component 60 thus forces cool air into the combustion chamber 50, which can lower the exhaust temperature, providing a benefit to those embodiments of the present invention where air-cooled applications are preferred.

Figure 2A:
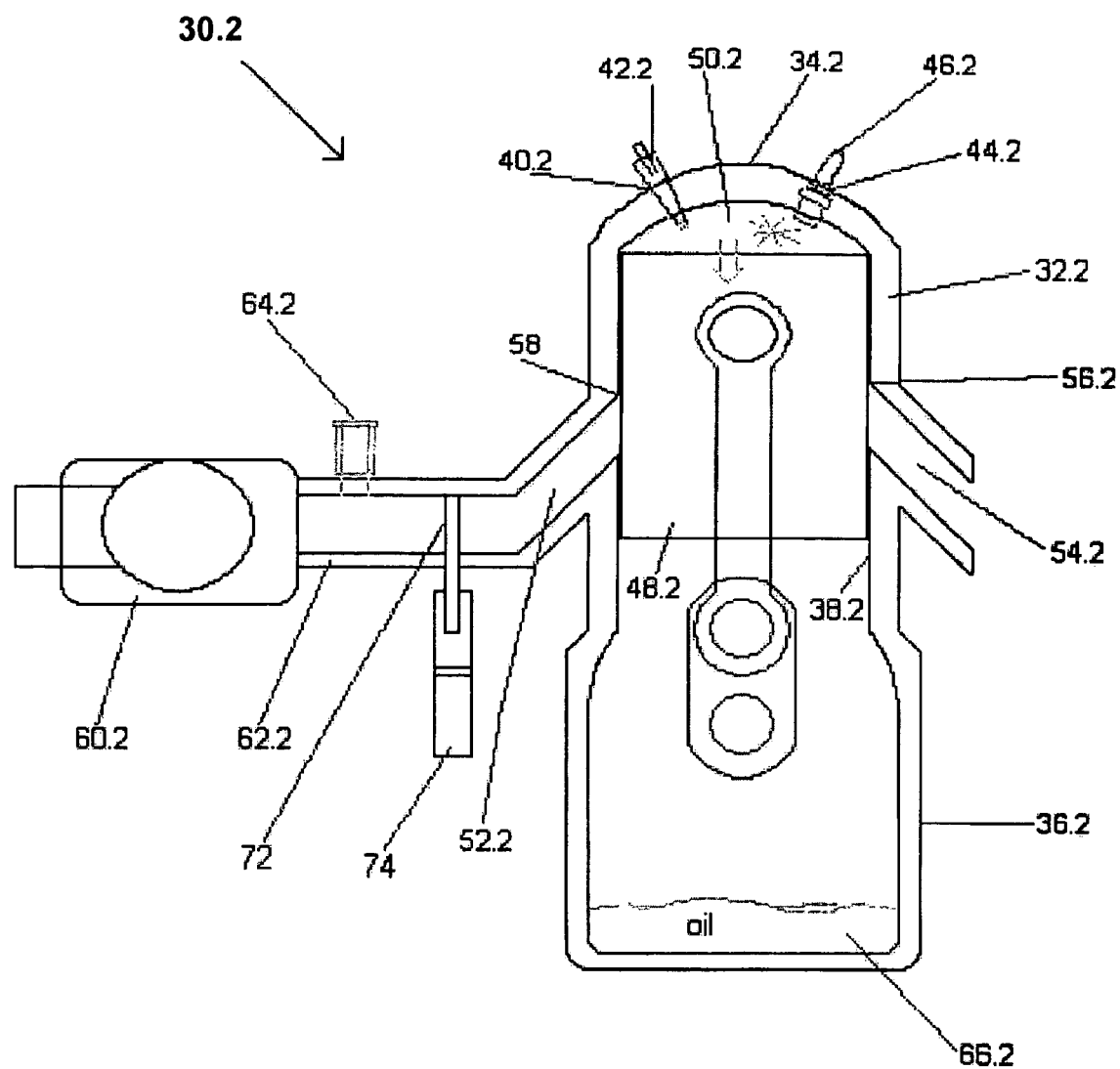
FIGS. 2a–f show views in cross-section of another embodiment of the present invention illustrated respectively in a combustion position, an exhaust position, an intake position, a bottom dead center position, a first compression position and a second compression position.

In another embodiment of the invention, wherein like parts have like reference numerals with an additional suffix ".2", there is illustrated in FIG. 2a a two stroke internal combustion engine indicated generally by reference numeral 30.2. The basic structure of the engine 30.2 is similar to the engine 30 of the previous embodiment.

The engine 30.2 additionally has an inlet valve 72 between a forced induction component 60.2 and an inlet port 52.2. The inlet valve 72 isolates pressurized air, coming from the forced induction component 60.2, from the inlet port 52.2. This allows more control over the pressure exerted on the piston 48.2 and crankcase 36.2. The inlet valve 72 is actuated in this example by an electric actuator, e.g. a solenoid 74, but may be actuated by other means, e.g. mechanical means.

Figure 2B:
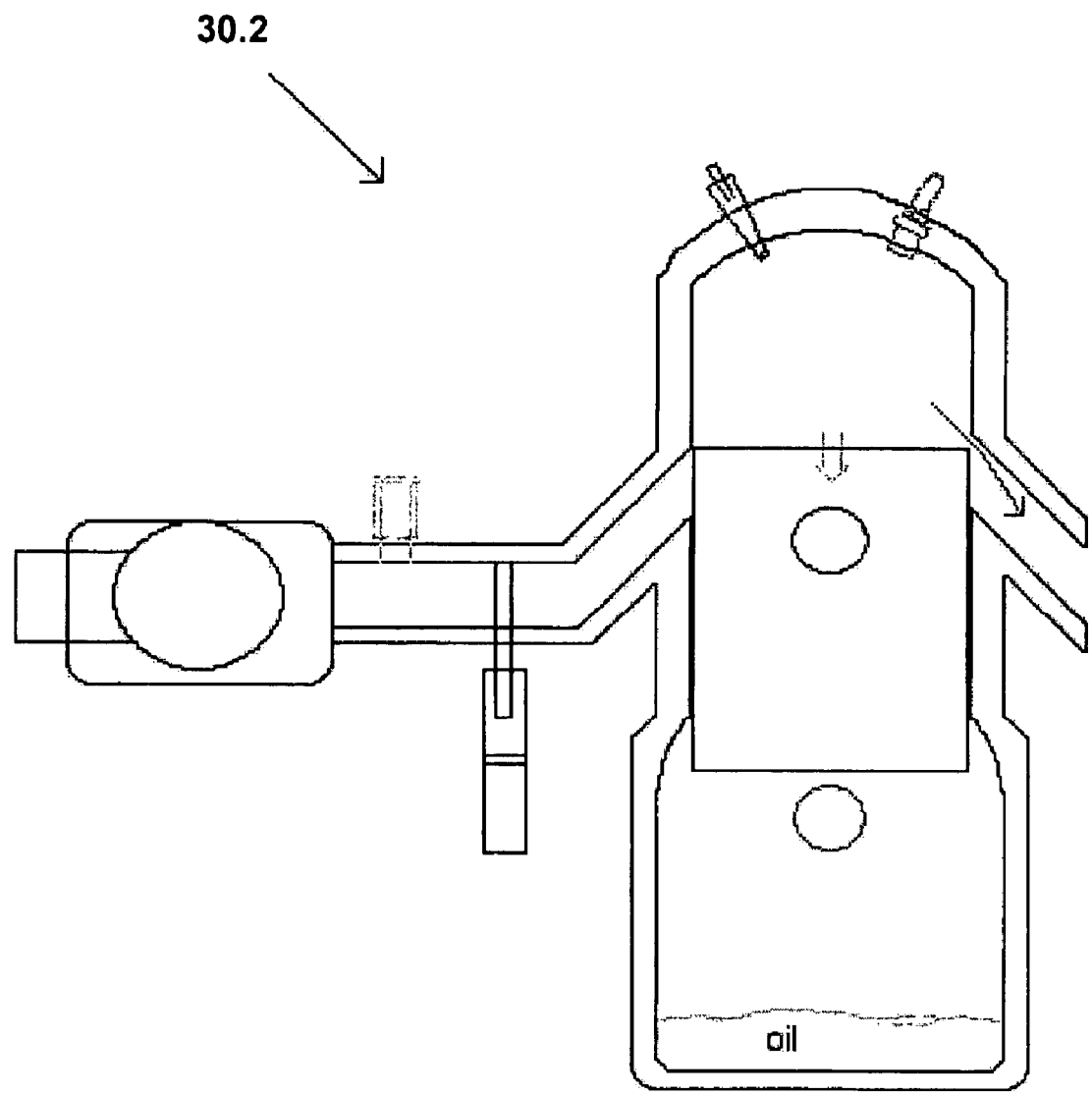
Figure 2C:
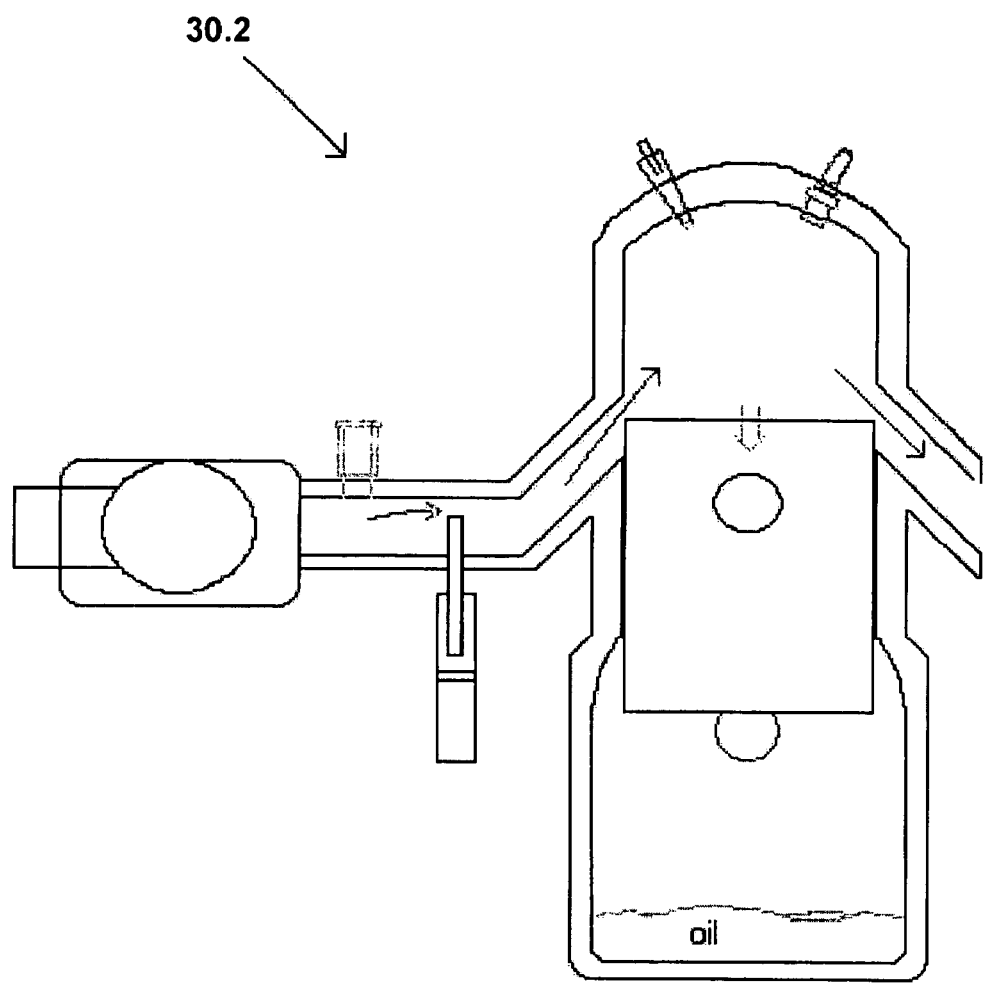
Figure 2D:
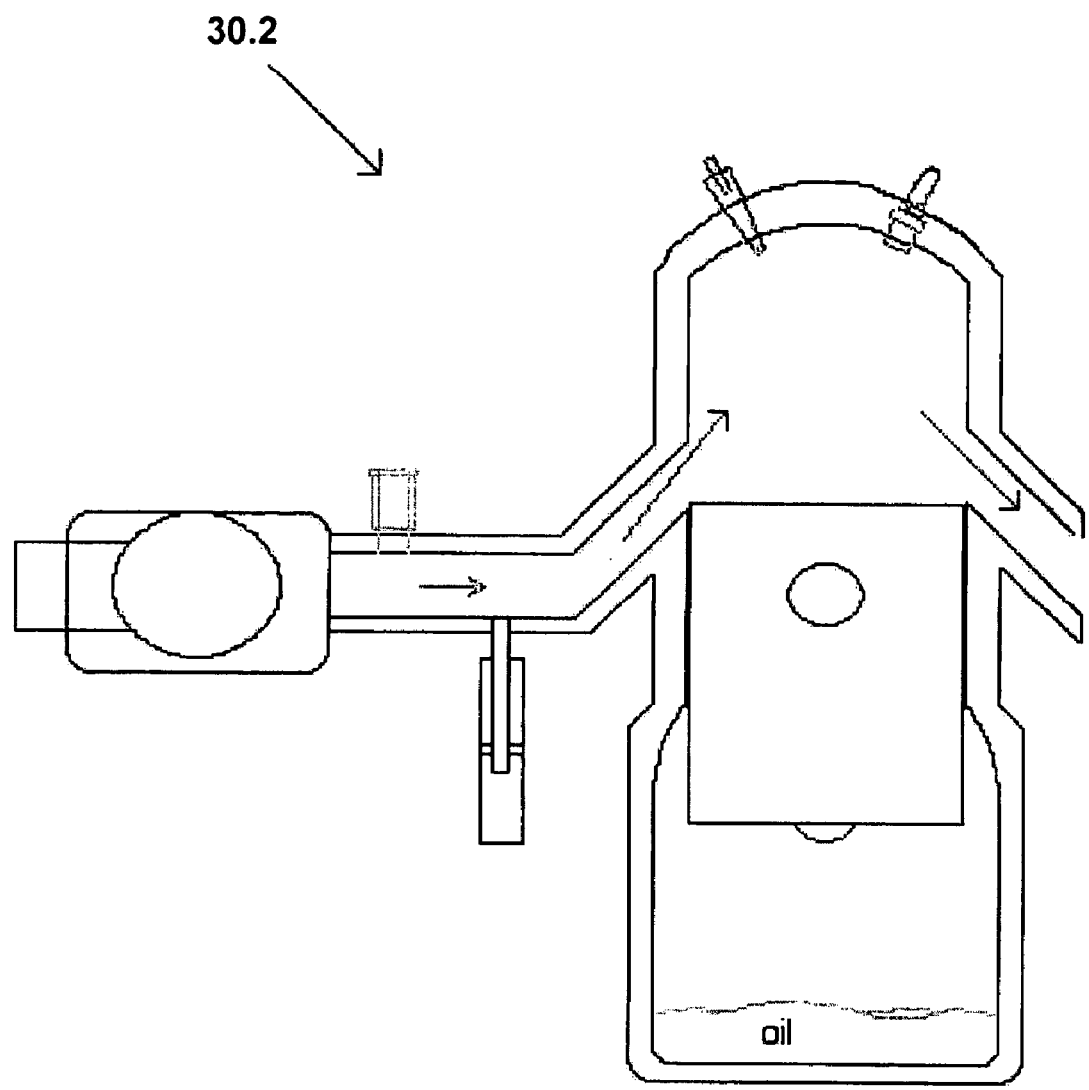
Figure 2E:
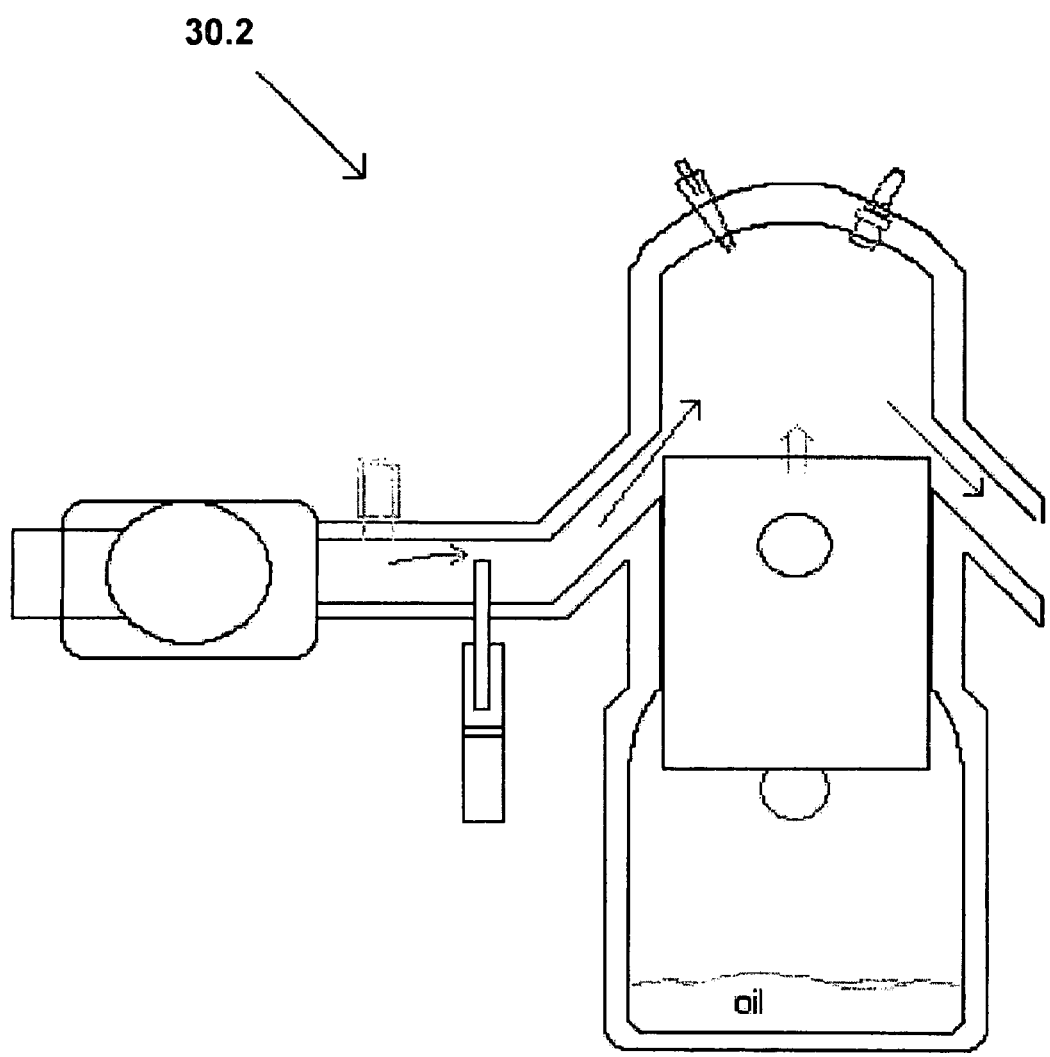
Figure 2F:
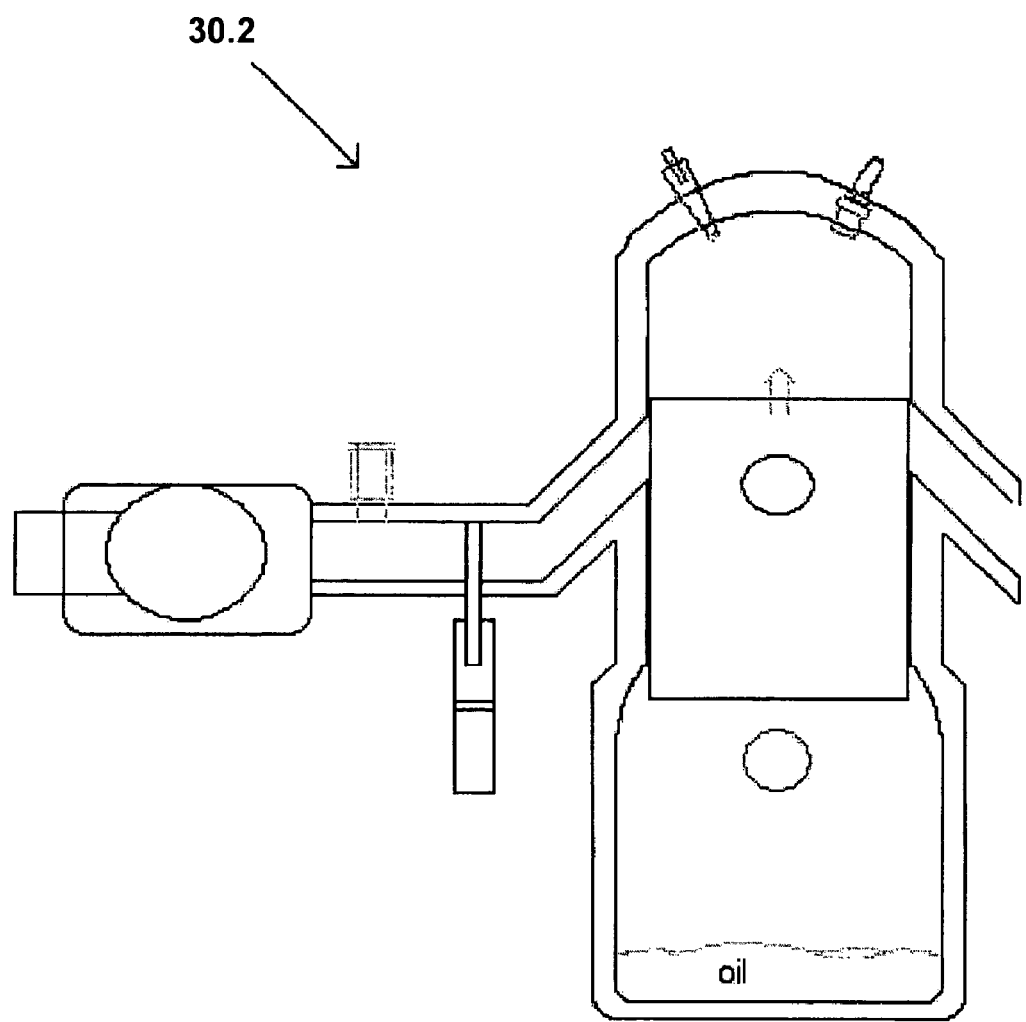

The inlet valve 72 opens in timed synchronization with a piston 48.2 uncovering the inlet port 52.2 during the exhaust cycle, as illustrated in FIGS. 2b–d, to allow pressurized new air to enter a combustion chamber 50.2. The inlet valve 72 closes in timed synchronization with the piston 48.2 covering the inlet port 52.2 during the compression cycle as illustrated in FIGS. 2e–f.

Figure 3A:
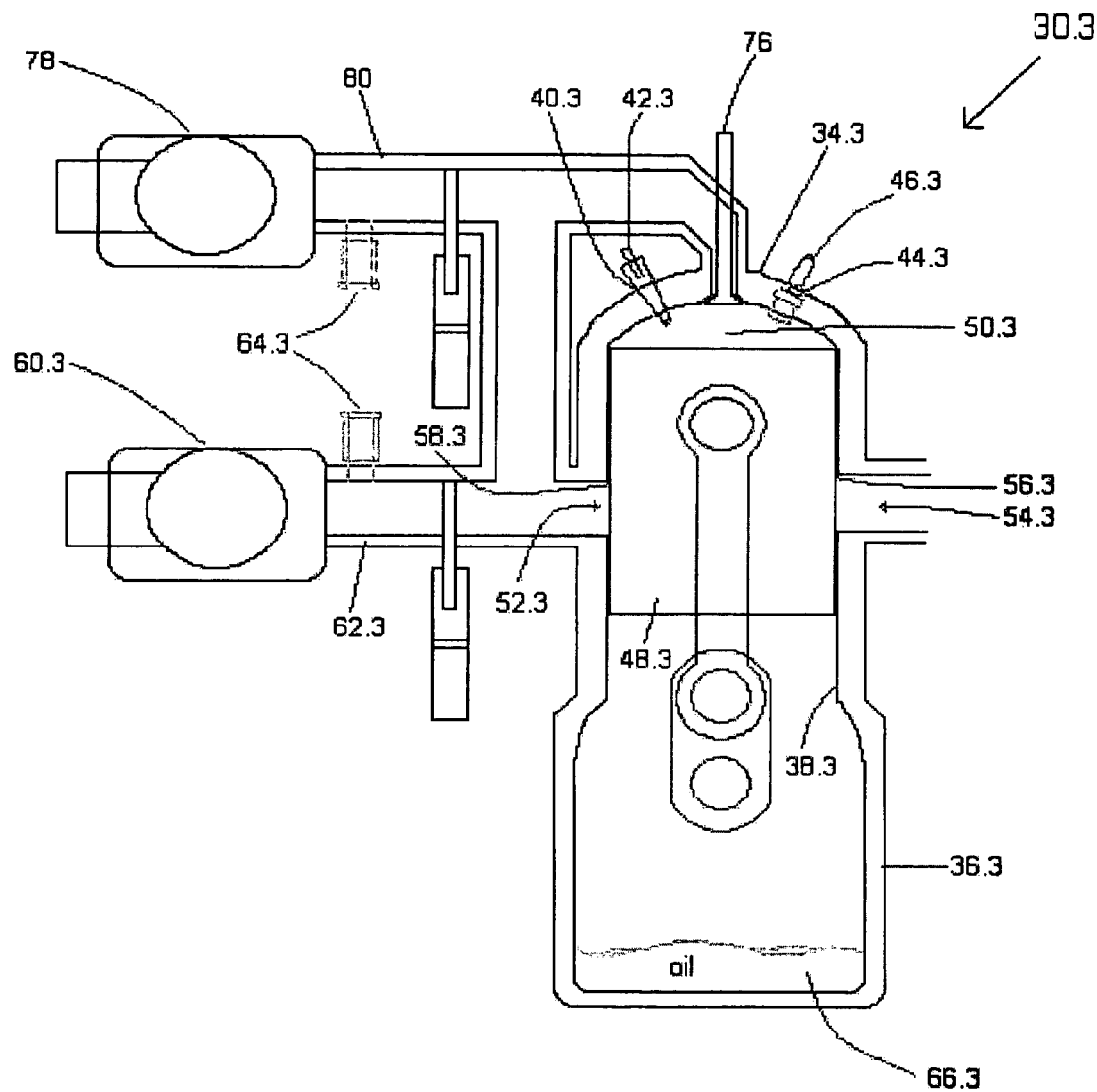
FIGS. 3a–b show views in cross-section of another embodiment of the present invention illustrating an inlet valve in a closed position and an open position, respectively.

In another embodiment of the invention, wherein like parts have like reference numerals with an additional suffix ".3", there is illustrated in FIG. 3a a two stroke internal combustion engine indicated generally by reference numeral 30.3. The structure of the engine 30.3 is similar to the engine 30 of the first embodiment.

The engine 30.3 additionally has an inlet valve 76, in this example a poppet valve, located in a cylinder head 34.3. The inlet valve 76 is connected to a forced induction component 78 by an inlet conduit 80. The forced induction component 60.3 can be a supercharger and the forced induction component 78 can be a turbocharger. At low RPM the forced induction component 60.3 provides a supply of fresh air, while at high RPM the forced induction component 78 provides the supply of fresh air. The operation of superchargers and turbochargers is well known in the art.

Figure 3B:
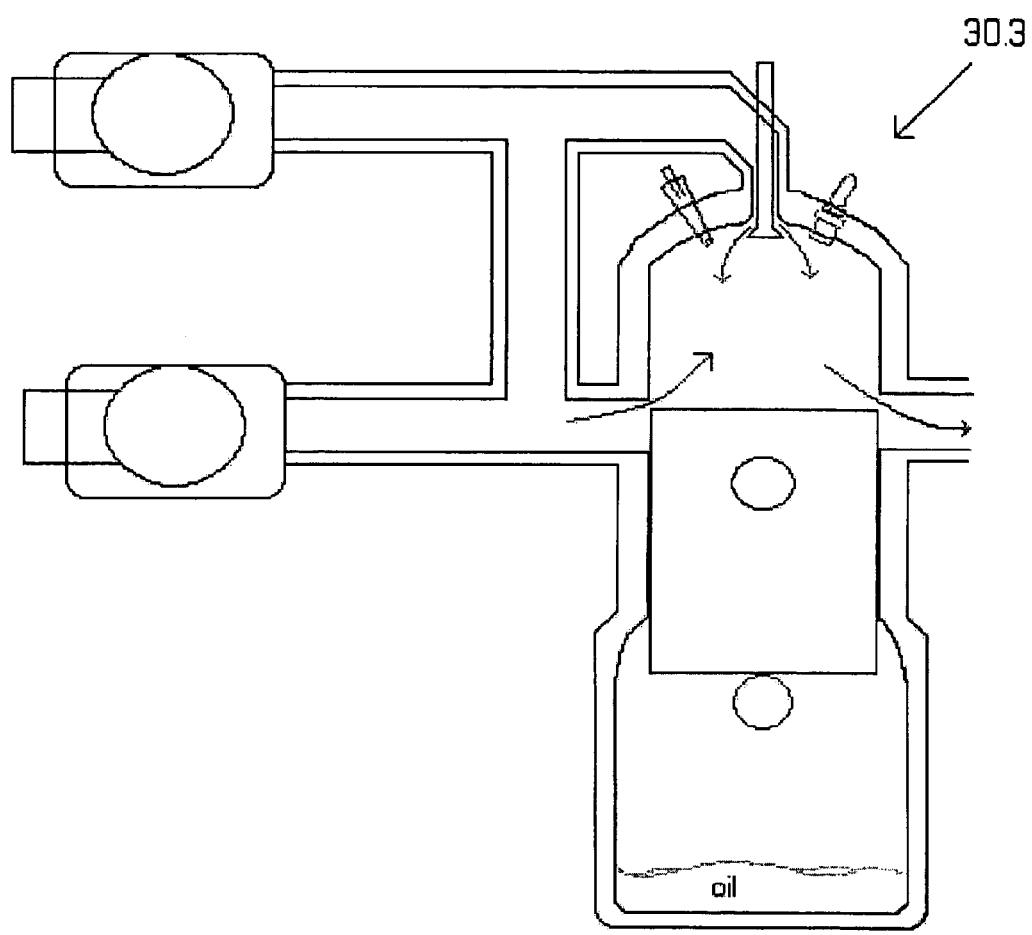

The inlet valve 76 opens in timed synchronization with a piston 48.3 uncovering an inlet port 52.3 during the exhaust cycle, as illustrated in FIG. 3b, to allow pressurized new air to enter a combustion chamber 50.3. The inlet valve 76 closes in timed synchronization with the piston 48.3 covering the inlet port 52.3 during the compression cycle. The inlet valve 76 is actuated by an electric actuator, e.g. a solenoid, in this example, but can be actuated by other means, e.g. mechanical means. An advantage of the inlet valve 76 is improved breathability at high RPM.

Figure 4:
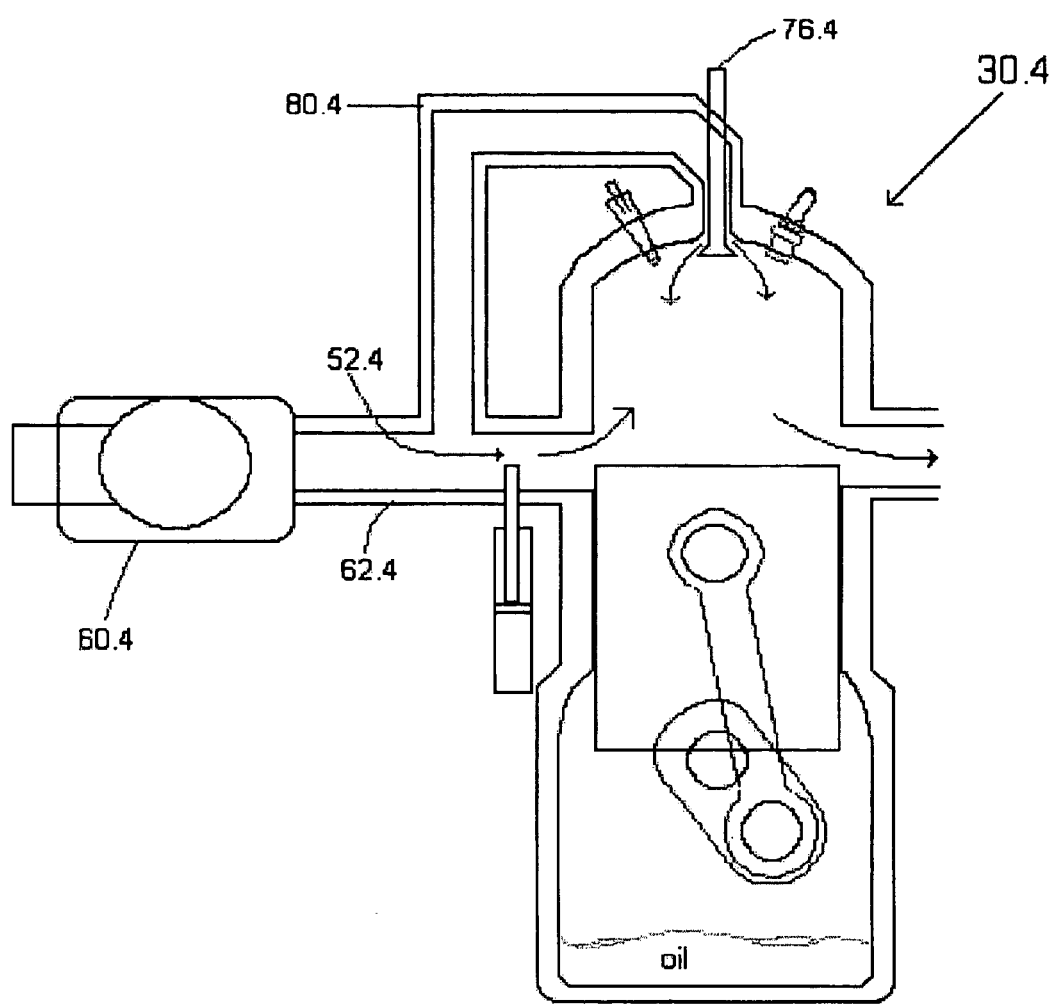
FIG. 4 shows a view in cross-section of another embodiment of the present invention having a pair of inlet valves.
Figure 5:
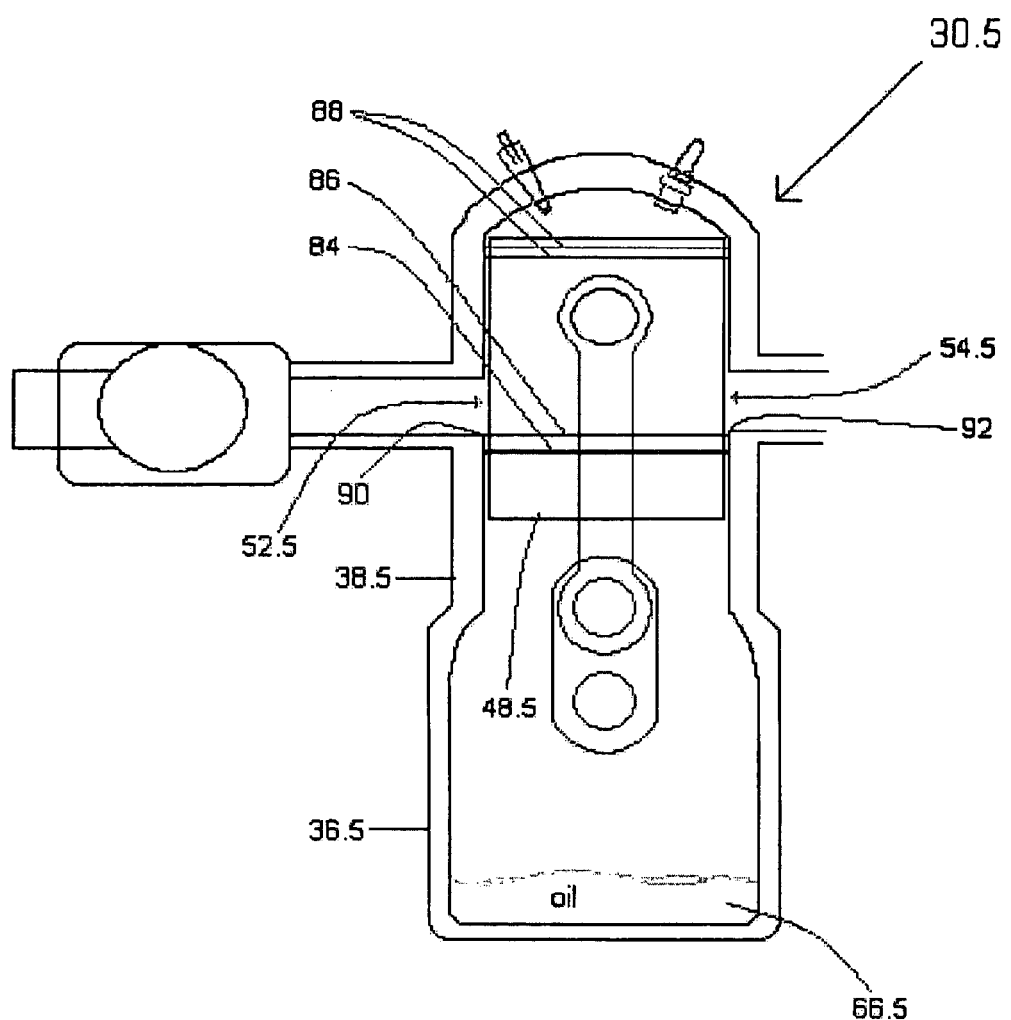
FIG. 5 shows a view in cross-section of another embodiment of the present invention illustrating a sealing means between a crankcase and a combustion chamber.

In another embodiment of the invention, wherein like parts have like reference numerals with an additional suffix ".4", there is illustrated in FIG. 4 a two stroke internal combustion engine indicated generally by reference numeral 30.4. The structure of the engine 30.4 is similar to the engine 30.2 and the engine 30.3 of the previous embodiments. In the present embodiment, however, an inlet conduit 80.4 is attached to the inlet conduit 62.4. A forced induction component 60.4 forces pressurized air towards an inlet port 52.4 and an inlet valve 76.4.

Figure 6:
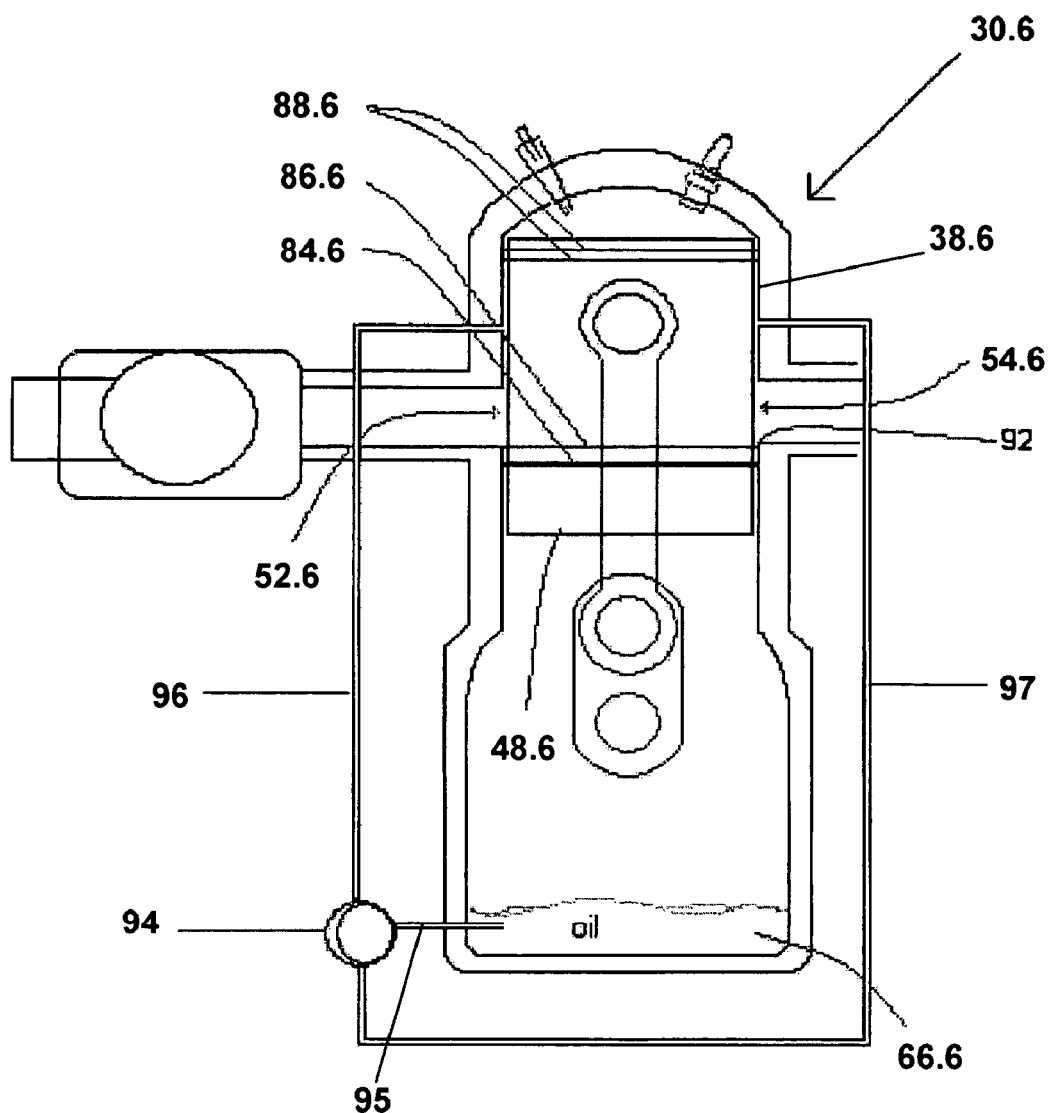
FIG. 6 shows a view in cross-section of another embodiment of the present invention illustrating an oil pump.

In another embodiment of the present invention wherein like parts have like reference numerals with an additional suffix ".6", there is illustrated in FIG. 6 a two stroke internal combustion engine indicated generally by reference numeral 30.6. A piston 48.6 has a first oil ring 84, a lower first compression ring 86 and a pair of upper second compression rings 88. The oil ring 84 is lubricated from the oil 66.6 in the crankcase 36.6. The pair of upper compression rings 88, which are at an upper end of piston 48.6, opposite from the crankcase 36.6, are lubricated by a controlled oil flow that provides lubrication to the cylinder wall while not overflowing into the combustion chamber.

The piston 48.5 is illustrated in a top dead center position, where the oil ring 84 and lower compression ring 86 are positioned below an edge 90 of an inlet port 52.5 and below an edge 92 of an exhaust port 54.5.

In another embodiment of the present invention wherein like parts have like reference numerals with an additional suffix ".6", there is illustrated in FIG. 6 a two stroke internal combustion engine indicated generally by reference numeral 30.6. An oil pump 94 receives a supply of crankcase oil 66.6 through duct 95 and pumps the crankcase oil through ducts 96 and 97 to the cylinder wall 38.6. The crankcase oil 66.6 through ducts 96 and 97 serves to lubricate the compression rings 88.6 for reciprocating motion along the cylinder wall 38.6.

As will be apparent to those skilled in the art, various modifications may be made within the scope of the appended claims.

What is claimed is:

1. A two stroke internal combustion engine comprising:
  a cylinder, the cylinder having a cylinder head, a wall and a crankcase, the wall extending between the cylinder head and the crankcase and the cylinder head having first and second openings;
  a piston mounted for reciprocation in the cylinder;
  the cylinder head, the wall and the piston forming a combustion chamber;
  a direct injector mounted in the first opening for injecting fuel into the combustion chamber;
  a spark plug mounted in the second opening for igniting a fuel-air mixture in the combustion chamber;
  an inlet port in the wall of the cylinder;
  an exhaust port in the wall of the cylinder;
  the exhaust port being exposed by the piston before the inlet port on an exhaust cycle so a pressurized exhaust gas is substantially exhausted before the inlet port opens;
  a first forced air induction means for forcing air into the inlet port, the first forced air induction means being connected to the inlet port;
  sealing means for preventing crankcase oil from entering the intake and exhaust ports and the combustion chamber, the sealing means being between the piston and the wall of the cylinder below the inlet port and the outlet port when piston is at the top dead center position of a revolution cycle;
  a first compression ring between the piston and the wall of the cylinder below the inlet port and the outlet port at the top dead center position of a revolution cycle;
  a second compression ring being at the end of the piston opposite from the crankcase; and
  a method for delivering oil lubricants to the second compression ring so that only enough lubricants is delivered to provide lubrication, but not excessive lubricants to overflow into the inlet port, the exhaust port, and the combustion chamber.

2. The engine as claimed in claim 1, wherein the engine further includes an inlet conduit connecting the first forced air induction means to the inlet port.

3. The engine as claimed in claim 1, wherein the engine further includes an inlet valve connected between the first forced air induction means and the inlet port, the inlet valve opening and closing in synchronization with the piston opening and closing the inlet port.

4. The engine as claimed in claim 3, wherein the inlet valve is actuated by an electric actuator.

5. The engine as claimed in claim 4, wherein the inlet valve is actuated by a mechanical means.

6. The engine as claimed in claim 1, wherein the engine further includes an inlet valve in the cylinder head, the inlet valve opens and closes in synchronization with the piston opening and closing the inlet port.

7. The engine as claimed in claim 6, wherein the engine further includes a second forced air induction means connected to the inlet valve.

8. The engine as claimed in claim 6, wherein the inlet valve is actuated by an electric actuator.

9. The engine as claimed in claim 6, wherein the inlet valve is actuated by a mechanical means.

10. The engine as claimed in claim 6, wherein the inlet valve is a poppet valve.

11. The engine as claimed in claim 1, wherein the first forced air induction means is a supercharger.

12. The engine as claimed in claim 1, wherein the first forced air induction means is a turbocharger.

13. The engine as claimed in claim 1, wherein the engine further includes:
a first inlet valve in the cylinder head;
a second inlet valve adjacent the inlet port;
a first inlet conduit connecting the first inlet valve to the first forced air induction means; and
a second inlet conduit connecting the second inlet valve to the first forced air induction means.

14. The engine as claimed in claim 1, wherein the sealing means include an oil ring around a periphery of the piston.

15. The engine as claimed in claim 11, wherein the supercharger is driven by a belt & pulley, or by an electric motor.

16. The engine as claimed in claim 2, wherein the engine further includes a blow-off valve attached to the inlet conduit, the blow-off valve operable to relieve excessive pressure in the inlet conduit.

17. The engine as claimed in claim 4, wherein the electric actuator is a solenoid.

18. The engine as claimed in claim 8, wherein the electric actuator is a solenoid.

19. The engine as claimed in claim 7, wherein the first forced air induction means is a supercharger and the second forced air induction means is a supercharger.

20. The engine as claimed in claim 7, wherein the first forced air induction means is supercharger and the second forced air induction means is a turbocharger.

21. The engine as claimed in claim 14, wherein the sealing means include a first compression ring around a periphery of the piston.

22. The engine as claimed in claim 21, including a second compression ring, which is one of the compression rings, around the periphery of the piston; the second compression rings being at an end of the piston opposite from the crankcase.

23. The engine as claimed in claim 22, wherein the engine further includes:
an oil pump;
at least one supply duct connecting an input of the oil pump to the crankcase, the supply duct providing oil from the crankcase to the oil pump;
at least one delivery duct connecting an output of the oil pump to the wall of the cylinder, the delivery duct delivering oil from the oil pump to the wall of the cylinder.

24. In combination a two stroke internal combustion engine and a vehicle propelled by said engine, the two stroke internal combustion engine comprising:
a cylinder, the cylinder having a cylinder head, a wall and a crankcase, the wall extending between the cylinder head and the crankcase and the cylinder head having first and second openings;
a piston mounted for reciprocation in the cylinder;
the cylinder head, the wall and the piston forming a combustion chamber;
a direct injector mounted in the first opening for injecting fuel into the combustion chamber;
a spark plug mounted in the second opening for igniting a fuel-air mixture in the combustion chamber;
an inlet port in the wall of the cylinder;
an exhaust port in the wall of the cylinder;
the exhaust port being exposed by the piston before the inlet port on an exhaust cycle so a pressurized exhaust gas is substantially exhausted before the inlet port opens;
a first forced air induction means for forcing air into the inlet port, the first forced air induction means being connected to the inlet port;
sealing means for preventing crankcase oil from entering the intake and exhaust ports and the combustion chamber, the sealing means being between the piston and the wall of the cylinder below the inlet port and the outlet port when piston is at the top dead center position of a revolution cycle;
a first compression ring between the piston and the wall of the cylinder below the inlet port and the outlet port at the top dead center position of a revolution cycle;
a second compression ring being at the end of the piston opposite from the crankcase; and
a method for delivering oil lubricants to the second compression ring so that only enough lubricants is delivered to provide lubrication, but not excessive lubricants to overflow into the inlet port, the exhaust port, and the combustion chamber.

25. In combination a two stroke internal combustion engine and a boat propelled by said engine, the two stroke internal combustion engine comprising:
a cylinder, the cylinder having a cylinder head, a wall and a crankcase, the wall extending between the cylinder head and the crankcase and the cylinder head having first and second openings;
a piston mounted for reciprocation in the cylinder;
the cylinder head, the wall and the piston forming a combustion chamber;
a direct injector mounted in the first opening for injecting fuel into the combustion chamber;
a spark plug mounted in the second opening for igniting a fuel-air mixture in the combustion chamber;
an inlet port in the wall of the cylinder;
an exhaust port in the wall of the cylinder;
the exhaust port being exposed by the piston before the inlet port on an exhaust cycle so a pressurized exhaust gas is substantially exhausted before the inlet port opens;
a first forced air induction means for forcing air into the inlet port, the first forced air induction means being connected to the inlet port;
sealing means for preventing crankcase oil from entering the intake and exhaust ports and the combustion chamber, the sealing means being between the piston and the wall of the cylinder below the inlet port and the outlet port when piston is at the top dead center position of a revolution cycle;

a first compression ring between the piston and the wall of the cylinder below the inlet port and the outlet port at the top dead center position of a revolution cycle;

a second compression ring being at the end of the piston opposite from the crankcase; and a method for delivering oil lubricants to the second compression ring so that only enough lubricants is delivered to provide lubrication, but not excessive lubricants to overflow into the inlet port, the exhaust port, and the combustion chamber.

26. A method of exhausting pressurized exhaust gas during an exhaust cycle from a two stroke internal combustion engine, the two stroke combustion engine comprising a cylinder having a cylinder head at one end, a wall and a crankcase at an end opposite the one end, the wall extending between the cylinder head and the crankcase, the cylinder head having a first opening and a second opening, a piston mounted for reciprocation in the cylinder, the cylinder head, the wall and the piston forming a combustion chamber, sealing means for preventing crankcase oil from entering the combustion chamber, the sealing means being between the piston and the wall, a fuel injector mounted in the first opening for injecting fuel into the combustion chamber, a spark plug mounted in the second opening for igniting a fuel-air mixture in the combustion chamber, an inlet port in the wall of the cylinder, an exhaust port in the wall of the cylinder, the exhaust port and the inlet port being at substantially diametrically opposite locations in the cylinder, the inlet port and the exhaust port being opened and closed by the reciprocating piston, the exhaust port being opened before the inlet port on an exhaust cycle so a pressurized exhaust gas is substantially exhausted before the inlet port opens, and a forced air induction means for forcing air into the inlet port, the forced air induction means being connected to the inlet port, the method comprising the steps of:

opening the exhaust port by the travel of the piston during the exhaust cycle;

exhausting a substantial portion of the pressurized exhaust gas;

opening the inlet port by the travel of the piston during the exhaust cycle;

forcing air into the combustion chamber through the inlet port;

scavenging remaining exhaust gases;

exhausting scavenged exhaust gas;

sealing the piston being sealed to the wall of the cylinder below the inlet port and the outlet port in the top dead center position of a revolution cycle to prevent crankcase oil from entering the inlet port, the exhaust port, and the combustion chamber; and delivering oil lubricants to the second compression ring so that only enough lubricants is delivered to provide lubrication, but not excessive lubricants to overflow into the inlet port, the exhaust port, and the combustion chamber.

* * * * *